United States Patent

[11] 3,569,849

[72] Inventors John J. Cassidy
Newton Centre;
Melvin F. Silverstein, Holbrook, Mass.
[21] Appl. No. 736,186
[22] Filed June 11, 1968
[45] Patented Mar. 9, 1971
[73] Assignee Beta Instrument Corporation
Newton Upper Falls, Mass.

[54] DEFLECTION AMPLIFIER
20 Claims, 1 Drawing Fig.

[52] U.S. Cl. .......... 330/24, 330/17, 330/30
[51] Int. Cl. .......... H03f 3/04, H03f 3/68
[50] Field of Search .......... 330/13, 17, 18, 22, 24, 30, 30 (D), 69, 32

[56] References Cited
UNITED STATES PATENTS

| | | | |
|---|---|---|---|
| 3,077,566 | 2/1963 | Vosteen .......... | 330/30X |
| 3,154,639 | 10/1964 | Rakha et al. .......... | 330/13X |
| 3,233,184 | 2/1966 | Wheatley, Jr. .......... | 330/22X |
| 3,290,520 | 12/1966 | Wennik .......... | 330/69X |
| 3,310,688 | 3/1967 | Ditkofsky .......... | 330/30X |
| 3,312,833 | 4/1967 | Durrett .......... | 330/17X |
| 2,647,958 | 8/1953 | Barney .......... | 330/32 |
| 3,305,733 | 2/1967 | Jahn .......... | 330/15 |
| 3448,395 | 6/1969 | Webb .......... | 330/15 |
| 3471,794 | 10/1969 | Gugliotti, Jr. .......... | 330/30X |

OTHER REFERENCES

Hersher— Designing Transistor A- F Power Amplifiers— Electronics pp. 96— 99, April 1958, (330— 13)

*Primary Examiner*—Roy Lake
*Assistant Examiner*—Lawrence J. Dohl
*Attorney*—W. Hugo Liepmann

ABSTRACT: A semiconductor wide-bandwidth amplifier for driving the deflection coil of a cathode-ray tube or like electrical load employs an adjustably-coupled differential input stage and also has an electronic voltage-buffer circuit that makes efficient operation possible with the large supply voltage that drives the load. Two paths for operating power in the amplifier have complimentary effects to maintain a stable output signal when the supply voltage fluctuates. A push-pull output stage has quick bipolar limiting without semiconductor saturation and employs a constant bias to provide stable quiescent bias current during supply voltage variations.

PATENTED MAR 9 1971 3,569,849
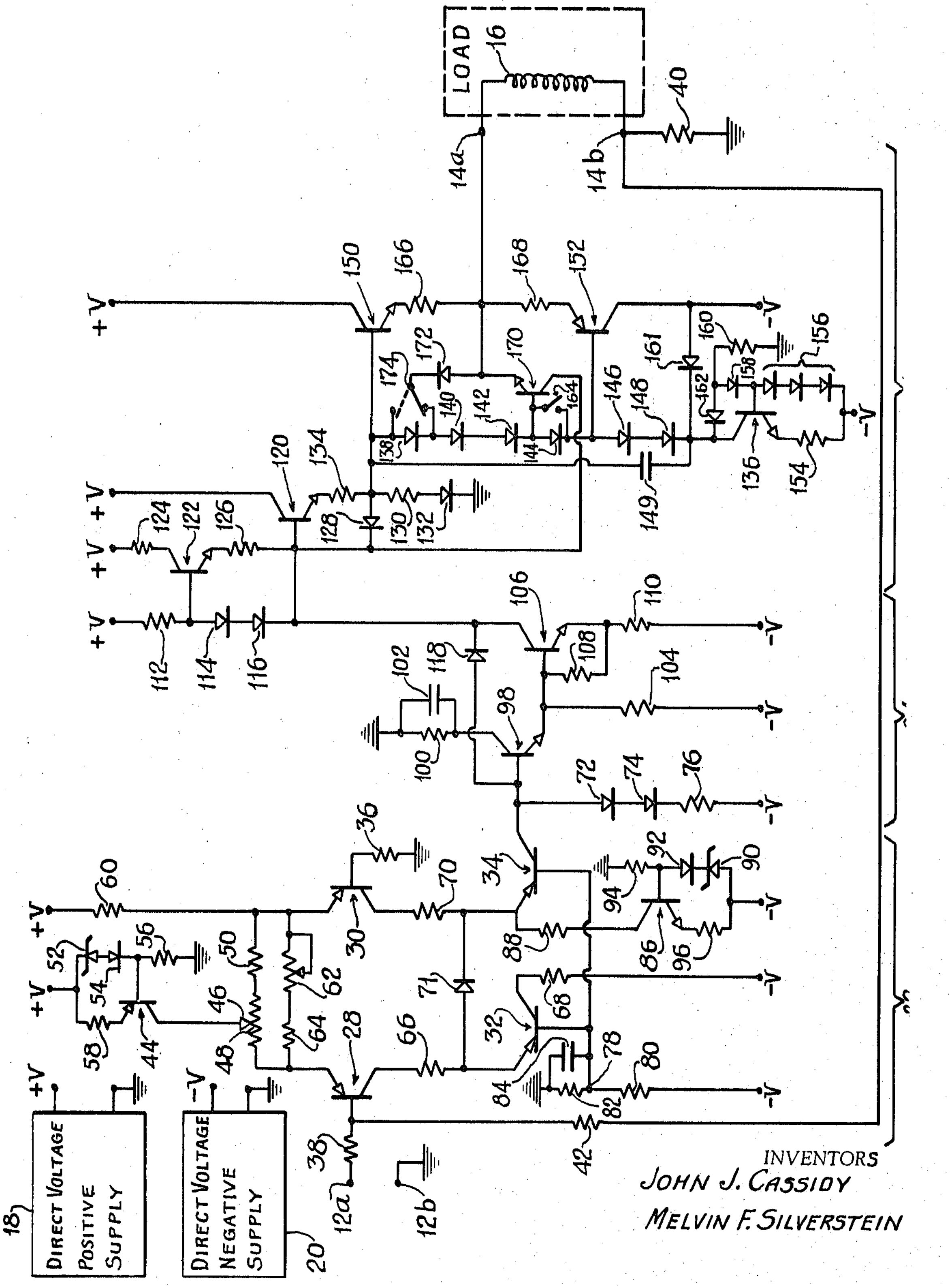
INVENTORS
JOHN J. CASSIDY
MELVIN F. SILVERSTEIN

DEFLECTION AMPLIFIER

BACKGROUND

This invention relates to an electronic semiconductor amplifier for driving an electromagnetic deflection coil of a cathode ray tube or a like electrical load. The amplifier has a gain control that is readily adjusted to provide the same degree of damping with coils of different inductances over substantially the same bandwidth. The amplifier is further arranged to develop an output current that exhibits little change when the supply voltages fluctuate.

In addition, the amplifier operates with a variety of supply voltages. This frees the user from requiring a supply uniquely tailored to the amplifier. Moreover, it enables the user to select different supply voltages, as required to provide the desired transient characteristics in both the positive and negative directions. Further characteristics of the amplifier are fast response to changing input signals, overload protection and limiting operation without semiconductor saturation.

These features, and others described below, enable a single amplifier embodying the invention to be used with different deflection coils and with a variety of electrical supplies. This enables the same amplifier to be used in providing different electron beam display systems.

Amplifiers of the present type are designed to operate a cathode ray tube deflection coil, i.e. an inductive coil disposed about the neck of a cathode-ray tube. The amplifier applies current to the deflection coil to produce the electromagnetic field needed to deflect the electron beam in the tube as required to display information on the face of the tube. In equipment of this type, the inductance of the deflection coil tends to resonate with other reactances associated with the coil and with the amplifier driving it, particularly where the amplifier has a wide bandwidth capability, as often required. Such resonances are undesirable. Accordingly, one problem is to provide a deflection amplifier having an output impedance that causes transient operation of the coil to be critically damped, or to have some other selected damping characteristic, over a wide operating frequency. This is particularly difficult to realize when the amplifier is to be used with coils of different reactances. Considered somewhat differently, the frequency response characteristic of the amplifier and the response of the deflection coil load generally combine to produce varied responses, which is undesirable, depending on the coil inductance. The prior solution of using a damping resistor, in parallel with the electrical load and adjusted for the desired damping condition, dissipates excessive power and is generally of limited effectiveness.

In addition, many prior deflection amplifiers require power supplies producing rather precisely defined output voltages. Further, the power supplies are often required to have considerable regulation to stabilize the voltage supplied to the amplifier. Also, prior deflection amplifiers often are limited to operation with a single set of supply voltages. This precludes their use with other available supplies. Further, it restricts their capability to provide different deflection characteristics as often required for different display systems.

Accordingly, it is an object of the present invention to provide an improved electromagnetic deflection amplifier. More generally, it is an object to provide a semiconductor amplifier of improved capability for driving an inductive load, particularly at frequencies in the low megahertz range.

Another object of the invention is to provide a deflection amplifier having improved damping control; and particularly a wide range of damping control.

A further object of the invention is to provide a deflection amplifier capable of wide bandwidth operation with different deflection coils.

Further, it is an object to provide such an amplifier capable of relatively stable operation with supplies subject to fluctuations in output voltage.

Also, it is an object to provide a deflection amplifier of the above character capable of operation with supplies of different output voltages.

Another object of the invention is to provide a semiconductor deflection amplifier capable of operation with large supply voltages and correspondingly capable of developing large voltages across inductive loads.

It is also an object of the invention to provide a deflection amplifier of the above character capable selectively of class A operation or class AB operation.

A further object of the invention is to provide a deflection amplifier of the above character which automatically limits the output current to protect against damage in case an unusually low impedance is applied across the output terminals, and in case an excessive input signal is applied to it.

Other objects of the invention include the provision of a deflection amplifier having fast transient response.

Further objects of the invention will in part be obvious and will in part appear hereinafter.

The invention accordingly comprises the features of construction, combination of elements, and arrangement of parts exemplified in the construction hereinafter set forth, and the scope of the invention is indicated in the claims.

SUMMARY

In brief, a semiconductor electronic amplifier embodying the invention operates with a single positive supply voltage and a single negative supply voltage, as distinguished from requiring numerous positive and negative supply voltages. Further, both supply voltages can have different values independent of each other. This enables the amplifier to be highly versatile in application.

A further feature is that the amplifier output current is relatively unaffected by fluctuations in the supply voltage; hence the voltage supplies can be unregulated. This is a considerable cost saving for the user.

A single gain control in the amplifier effects damping adjustment on an inductive load in such a manner that substantially the same bandwidth operation can be obtained with a variety of inductive loads. The damping control, which does not require the conventional coil damping resistor, has essentially no effect on other operational features of the amplifier.

The amplifier is further characterized by automatic overload protection, by stability against operational changes when the ambient temperature varies, by fast response, and by automatically limited operation with large input signals. Further, this limiting operation does not saturate the active semiconductor components of the amplifier. Hence, the amplifier resumes normal operation after a condition of limited operation in minimal time.

The amplifier is constructed with an input stage in which a differential circuit has adjustable coupling between the two portions thereof to adjust the amplifier's gain-bandwidth characteristics. A dual common base stage powers the differential circuit from the same large supply voltage that drives a push-pull output stage. An intermediate stage amplifies the signal from the input stage to drive an emitter follower in the input of the output stage.

The amplifier is so arranged that when its supply voltage fluctuates, it develops two signal components corresponding to the supply fluctuation. These components are made to cancel each other with the result that the amplifier operation is essentially unaffected by the supply fluctuation. In particular, one portion of the differential input circuit receives a current component dependent on the amplifier's supply voltage. The same supply voltage is applied to the output portion of the intermediate stage. However, the intermediate stage provides a signal inversion such that the supply-dependent component from the input stage cancels the supply-dependent component injected in the intermediate stage.

The output stage normally applies a fixed total bias voltage to two push-pull transistors developing the amplifier output current. The output stage is further arranged automatically to decrease the drive signal to either transistor when it begins to conduct an excessive output current. This provides protection against current overload. Further, when the amplifier receives large positive or negative input signals, it automatically limits the drive signals to the push-pull transistors. The limiting is attained without saturating any active semiconductor components, as desired for fast recovery.

DESCRIPTION OF DRAWING

For a fuller understanding of the nature and objects of the invention, reference should be had to the following detailed description taken in connection with the accompanying drawing, which is a schematic representation of an electromagnetic deflection amplifier embodying the invention.

DESCRIPTION OF ILLUSTRATED EMBODIMENT

Referring to the drawing, the amplifier receives an input signal at a pair of terminals 12*a*, 12*b*, the latter of which is connected to a common return conductor illustrated as ground. The output terminals 14*a*, 14*b* of the amplifier are shown connnected to an electrical load 16 in the form of a deflection coil of a cathode ray tube (not shown). The amplifier operates with a single supply 18 of positive direct voltage (+V) and a further single supply 20 of negative direct voltage (−V); these two supplies can, of course, be constructed as a single unit. Both supply voltages (+V) and (−V) are relative to ground.

The amplifier can be considered as having an input stage indicated generally at 22, and intermediate stage 24, and an output stage 26. In the input stage 22, transistors 28 and 30 form a differential circuit that drives a pair of common base transistors 32 and 34 forming a supply voltage buffer circuit. A resistor 36 is connected between the base of transistor 30 and ground, and a resistor 38 is connected between the terminal 12*a* and the base of transistor 28. The transistor 28 base also receives a feedback signal, developed across a sampling resistor 40 connected between the output terminal 14*b* and ground, applied to the base through a series resistor 42.

A transistor 44 is arranged in the input stage 22 as a constant current source to apply a fixed total current to the emitter of transistors 28 and 30. The current is applied to the tap 46 of an adjustable current divider 48 in series with a resistor 50 between the transistor emitters. Movement of the tap 46 along the current divider 48 adjusts the portion of the fixed collector current from transistor 44 each transistor 28 and 30 receives in the quiescent condition, i.e. with no input signal at the input terminal. A Zener diode 52, a conventional diode 54, and resistors 56 and 58 are connected with the (+V) supply voltage and the transistor 44 as shown to provide a fixed emitter-base bias, which results in a constant collector current.

Also in the input stage, a resistor 60 in addition delivers to the transistor 30 emitter a current dependent on the magnitude of the (+V) supply voltage.

An adjustable resistor 62, illustrated in series with a fixed resistor 64, is connected between the emitters of transistors of 28 and 30 to vary the coupling between these transistors and thereby adjust the amplifier gain. A further resistor 66 couples the collector of transistor 28 to the emitter of transistor 32, which has a resistor 68 in series between the collector and the (−V) supply voltage. The collector of transistor 30 is similarly coupled by resistor 70 to the emitter of common-base transistor 34, the collector of which can be considered as the output lead of the input stage 22. The collector load of transistor 34 is the input to the intermediate stage 24, which includes the series combination of a pair of diodes 72, 74 and resistor 76 connected between the collector and the negative supply terminal. The diodes 72, 74 compensate for thermal drift in the base-emitter voltage drops in intermediate stage transistors 98 and 106. The resistors 66 and 70 are desired primarily to suppress oscillations. In addition, a diode 71 is connected between the emitters of transistors 32 and 34 to limit the reverse voltage on transistor 34 base-emitter junction.

The bases of transistors 32 and 34 are connected directly to a tap 78 of a fixed voltage divider formed with resistor 80 connected to the negative supply terminal and resistor 82, in parallel with capacitor 84, connected between the tap 78 and ground.

It is desired to supply transistor 30 with a constant component of quiescent collector current from resistors 50 and 60 substantially equal to the transistor 28 quiescent collector current. The reason for equal quiescent collector currents is to provide thermal balance in the differential input transistors. However, the quiescent value of the transistor 28 collector current is preferably sufficiently large so that when directed to transistor 30 in response to a large positive input that turns off transistor 28, transistor 30 drives the successive stages to just short of saturating transistor 106 and deliver maximum output from the amplifier.

Further, it is desirable to remove this excess quiescent current transistor 30 receives, rather than apply it to transistor 34. For this purpose, the amplifier input stage 22 has also a transistor 86 arranged in a constant current circuit and connected, illustratively through resistor 88 between the transistor 86 collector and transistor 34 emitter, to remove from the collector current of transistor 30 a fixed current equal to the nominal current transistor 30 receives through resistor 50.

Transistor 30 receives emitter current also through resistor 60. This current, however, fluctuates with the value of the (+V) supply voltage. Hence a drop in the positive supply voltage causes a corresponding drop in the current transistor 30 receives through resistor 60, and hence decreases the emitter current transistor 34 receives. Conversely, an upward fluctuation in positive supply voltage increases the current transistor 30 receives via resistor 60, so that transistor 34 receives an emitter current larger than normal by the amount of the increase in the resistor 60 current due to the amount of the positive supply fluctuation. Accordingly, resistor 60 injects at the emitter of transistor 34, and hence at the output of the input stage 22, a current component corresponding in polarity and magnitude to fluctuations of the positive supply voltage. As described below, this fluctuating, supply-dependent current component is substantially canceled by an equal and opposite supply-dependent signal component at the output of the intermediate stage 24. The constant current source formed with transistor 86 is constructed with a Zener diode 90, conventional diode 92, and resistors 94 and 96 to provide the transistor with a fixed collector current.

In the intermediate stage 24, an emitter follower transistor 98 receives at its base the signal developed at the collector of transistor 34. A parallel resistor 100- capacitor 102 combination is connected between the transistor 98 collector and ground. A common emitter amplifier transistor 106 has the base connected directly to the emitter of transistor 98. A bias resistor 108 is connected between the transistor 106 base and emitter, and a degenerating resistor 110 is connected from the emitter to the (−V) supply. Resistor 104 connects from the transistor 106 base to the (−V) supply to speed up cutoff of that transistor. Resistor 108 aids this transition. The collector load of transistor 106 is resistor 112 in series between the (+V) supply and a pair of diodes 114, 116 connected to the transistor collector and arranged to conduct forward current in the same direction as the collector-emitter path through transistor 106. These diodes function in the output stage 26, rather than in the intermediate stage 24.

The intermediate stage 24 further includes a diode 118 connected to conduct forward current from the base of transistor 98 to the collector of transistor 106. It operates to prevent saturation of transistor 106 by limiting the negative excursion of transistor 106 collector potential relative to the potential at the base of transistor 98.

With further reference to the drawing, the output stage 26 of the illustrated deflection amplifier has a class A emitter follower transistor 120 having the base connected directly to the transistor 106 collector and its collector directly connected to the (+V) supply voltage. A diode 128 is in parallel with the transistor 120 emitter-base junction and conducts forward current when the transistor is cut off. In addition, a resistor 130 and a diode 132 are connected in series between the transistor 120 emitter and ground. A resistor 134 can be provided in series with the transistor 120 emitter as illustrated.

The illustrated amplifier includes also a transistor 122 operating as a constant current source. The base of this transistor is connected to the interconnection of resistor 112 and diode 114, so that the diodes 114 and 116 in conjunction with resistor 126 determine the value of transistor 122 emitter current. The transistor 122 collector is connected to the (+V) supply voltage through resistor 124, and the emitter is connected to the base of transistor 120. With this arrangement, transistor 122 applies a substantially fixed emitter current to the base of transistor 120 and collector of transistor 106.

Another constant current source in the output stage, formed with transistor 136, draws a fixed current through a succession of diodes 138, 140, 142, 144, 146, and 148 in series between the transistor 136 collector and the transistor 120 emitter. The forward voltage drop which the constant current develops across diodes 138, 140, 142, and 144 provides a total fixed bias for the two output transistors 150 and 152. The illustrated succession of diodes 138—144 provides class A operation of the output transistors 150, 152. Class AB operation is obtained by short circuiting diode 144; conveniently with a single-pole, single-throw switch 164 in parallel with the diode. A capacitor 149, connected between transistor 136 and transistor 120 emitter, prevents the transistor 120 emitter from going more negative than the base during transients in which the amplifier output voltage goes far negative.

The transistor 136 has a resistor 154 in series between its emitter and the (−V) supply voltage, and a series succession 156 of three diodes connected between its base and the same voltage. A diode 158 is in series with a resistor 160 between the transistor 136 base and ground, with the diode 158 arranged to conduct forward current in the same direction as the transistor base-emitter junction. A further diode 162 has its cathode connected to the transistor 136 collector and its anode to the interconnection of diode 158 and resistor 160.

The base of output transistor 150 is connected directly to the transistor 120 emitter; where resistor 134 is used, it is in series in the connection. The transistor collector is connected directly to the (+V) supply voltage. A pair of resistors 166 and 168, generally of equal value, is in series between the emitter of transistor 150 and the emitter of transistor 152. The interconnection of these resistors is connected to the amplifier output terminal 14*a*. The collector of transistor 152 is connected directly to the negative supply voltage. This arrangement of transistors 150 and 152 forms a push-pull type of balanced circuit.

For overload protection as described below, the output stage 26 also has a transistor 170 arranged with the collector connected to the base of the transistor 120, and the emitter connected to the interconnection of resistors 166 and 168. The transistor base is connected to the interconnection of diodes 142 and 144. Further, a diode 172 is in series between the interconnection of resistors 166 and 168 and the pole of a single-pole, double-throw switch 174 having one fixed contact connected to the interconnection of diodes 138 and 140 and the other fixed contact connected to the other side of diode 138. Switch 174 may be ganged with switch 164, for both switches are in the condition shown for class A operation and both are switched to the other position for class AB operation.

OPERATION

The constant current which the output stage transistor 136 draws through diodes 138—144 applies a fixed bias voltage between the base of transistor 150 and the base of transistor 152, i.e. across the base-emitter junction of each transistor 150, 152 and across the resistors 166 and 168. When the input voltage between terminals 12*a* and 12*b* is zero and the input stage voltage divider 48 is adjusted as preferred, the two output transistors 150 and 152 have equal emitter currents and the amplifier output voltage is at a quiescent value of zero volts. When the input voltage at terminal 12*a* rises positive, the amplifier drives transistor 152 to conduct a larger current and transistor 150 draws a correspondingly smaller current. As a result, the amplifier develops a more negative voltage at terminal 14*a*, delivering current to the negative supply from the output terminals and the load. Conversely, a negative input voltage to the amplifier causes transistor 150 to conduct more current than transistor 152. As a result, the amplifier develops a more positive voltage at terminal 14*a*, and draws current from the positive supply to output.

More particularly, with zero input voltage and assuming supplies 18 and 20 are stable at a selected value, the input stage transistors 28 and 30 deliver essentially equal currents to the emitters of transistors 32 and 34, respectively. The emitter-collector currents in the transistors 28 and 30 are substantially equal, and transistor 86 draws from the transistor 30 collector a current essentially equal to the resistor 50 current.

Thus with zero input voltage to the amplifier, transistor 34 receives a small quiescent emitter current and corresponding applies a current to the base of transistor 98. This transistor and the successive transistor 106 amplify the current so that transistor 106 draws a quiescent current through resistor 112 and the diodes 114, 116. Transistor 106 also conducts a major portion of the transistor 122 emitter current. The resultant voltage at the base of transistor 120 biases transistor 120 to conduct to its emitter the fixed current transistor 136 draws through diodes 138—148 plus a current that biases transistor 150 equal and opposite to the bias on transistor 152. Hence, the two transistors 150 and 152 conduct equal emitter currents and no net current is delivered to output terminal 14*a*.

When input terminal 12*a* receives an input signal that is positive relative to ground, by virtue of the feedback path, the amplifier operates to develop a negative voltage across resistor 40 sufficient to bring the voltage at transistor 28 base nearly back to zero relative to ground. To develop this negative voltage at terminal 14*b*, the amplifier first develops a negative voltage at terminal 14*a* with a magnitude dependent on the input voltage. The current in the load coil 16 gradually increases in response to this voltage to a level that develops the requisite feedback voltage across resistor 40.

The amplifier develops the negative voltage at terminal 14*a* by drawing additional current from the (−V) supply through transistor 152, load coil 16 and resistor 40. The amplifier causes the increase in transistor 152 conduction, and corresponding decrease in transistor 150 conduction, by decreasing the voltage at the base of transistor 120, thereby decreasing the emitter current the transistor applies to the transistor 150 base.

This drop in potential at transistor 120 base requires an increase in transistor 106 conduction. This, in turn, requires an increase in transistor 98 conduction, which is produced by an increase in that transistor's base current. Transistor 34 conducts harder to provide the increased base drive for transistor 98, which calls for increased conduction in transistor 30 and a corresponding decrease in transistor 28 conduction. This desired change in transistor 28 conduction is produced by the positive input signal that initially called for this operation.

Conversely, a drop in the input voltage results in transistor 150 drawing more current than transistor 152, so that positive current is delivered to output terminal 14*a*. This current is of a value to develop a positive voltage across sampling resistor 40 sufficient to restore a nearly zero voltage at transistor 28 base.

To consider the voltage limiting operation of the deflection amplifier, assume that it receives a large negative input signal so that transistor 28 is conducting hard and transistor 30 has minimal conduction. Generally in this condition transistor 30 is cut off and has essentially zero conduction. Diode 71 becomes conductive to furnish the current transistor 86 draws and thereby prevent emitter-base breakdown in transistor 34. Further, transistors 34, 98 and 106 each have zero conduction so that the voltage at the base of transistor 120 has the maximum positive value. It is under this condition that transistor 122 has maximum effect, for it delivers base current to transistor 120 without developing appreciable voltage drop across resistor 112. That is, without a base current supply for transistor 120 separate from resistor 112, the transistor 120 base current requirements would cause an undesirable voltage drop across resistor 112.

In response to the large positive voltage applied to the base of transistor 120, that transistor gradually drives output transistor 150 for maximum conduction, which constrains transistor 152 to have minimal conduction, or to be fully off, depending on whether the amplifier is set for class A or AB operation, respectively. Hence, the amplifier output voltage at terminal 14*a* has the maximum positive value. The voltage drop across resistor 112 prevents transistor 122 from saturating and this drop, plus that across the diodes 114 and 116, prevents transistor 120 from saturating during this positive voltage limiting condition. Further, the collector-emitter drop of transistor 120 maintains transistor 150 out of saturation. This absence of saturation during positive voltage limiting is desired to enable the amplifier to resume normal, nonlimiting operation with maximum speed when the large input signal terminates.

The illustrated amplifier operates in a negative voltage limiting condition when it receives a large positive input signal that causes transistor 30, and consequently transistors 34, 98 and 106 assume maximum conduction. The resultant large current drawn by transistor 106 drops the voltage at the base of transistor 120 sufficiently to turn that transistor off.

With conduction through transistor 120 interrupted due to the relatively large negative voltage at its base, and a large negative voltage at output terminal 14*a*, the positive charge on capacitor 149 limits the drop in voltage at the connection of the capacitor with the anode of diode 128 and the base of transistor 150. This action holds transistor 120 off. Further, diode 128 now is forward biased and provides a current path to the collector of conducting transistor 106. With the amplifier set for class A operation, transistor 150 remains conductive at a low level; with class AB operation it gradually ceases conduction under these condition.

The termination of conduction in transistor 120 also initially constrains the transistor 136 conduction to a low value. However, as the transistor 136 collector potential falls, diode 162 becomes conductive and diverts to the transitor collector some of the current diode 158 normally applies to the base. This action maintains transistor 136 out of saturation, as desired. Thereafter, as the current in the load coil increases in response to the negative voltage at terminal 14*a*, transistor 136 draws additional collector current through the transistor 152 base-emitter junction and diodes 146 and 148.

Still considering the negative voltage limiting operation, the voltage drops between the base of transistor 152 and the negative supply keep it from saturating, as desired. In addition, diode 118, between transistor 98 base and transistor 106 collector, becomes conductive and prevents the latter transistor from saturating. These precautions are desirable to enable the amplifier to resume normal operation, after the condition of negative voltage limiting, with minimal delay.

When the deflection amplifier is driven to either of the limiting conditions just described, and then resumes normal operation, the internal base-collector capacitances in transistors 150 and 152 must be charged and discharged accordingly. During transitions wherein the output current is increasing, transistor 120 supplies the positive currents for this capacitor charging and discharging operation. The negative current required for the opposite transitions is provided by the fixed current source of transistor 136, together with conduction through diode 128, which becomes forward biased during negative voltage limiting operation. This provision of charge and discharge currents enhances the high speed operation of the deflection amplifier.

A further feature of the deflection amplifier is automatic current limiting, which prevents it from being damaged by an excessive output current. The output stage diode 172 provides this operation for negative current, and transistor 170 for an excessive positive current. In particular, resistor 166 carries the positive output current, and the voltage at the interconnection of this resistor and resistor 168 drops as the positive output current increases. The emitter of transistor 170 is connected directly to this interconnection, and its base is maintained at a small fixed voltage below the emitter of transistor 150 by diodes 138, 140 and 142. For normal positive output currents, the drop across resistor 166 is insufficient to forward bias the emitter-base junction of transistor 170. However, an excessively large current through resistor 166 offsets the forward voltage drops in diodes 138, 140 and 142 and causes transistor 170 to commence conduction. When conducting, transistor 170 draws collector current from the base of transistor 120, thereby limiting the base drive to the latter transistor at a level that maintains a safe output current in resistor 166.

With protection, to negative overload current protection, diode 172 is arranged in parallel with the emitter-base junction of transistor 152; the connection being through resistor 168 and, for class A operation, through switch 174 and diodes 140, 142 and 144; for class AB operation diode 138 is also in the connection, but diode 144 is shorted out. These diodes bias the cathode of diode 172 more positive than the base of transistor 152. However, negative output current through resistor 168 develops a voltage across the resistor opposite to this bias voltage which the diodes maintain between the cathode of diode 172 and the base of transistor 152. When the negative output current approaches an excessive level, the voltage across resistor 168 forward biases diode 172 so that is diverts base current from transistor 152 directly to the output terminal 14*a*. This operation prevents the amplifier output current from exceeding a selected negative level.

As described above, in the amplifier input stage 22, the net effect of resistor 60 is to add a supply-dependent component to the current applied to the emitter of transistor 34. The polarity and magnitude of the current component correspond respectively to the polarity and magnitude of fluctuations in (+V) supply voltage. This source-dependent current component is amplified in transistors 34, 98 and 106 and hence appears as a component of the potential at the transistor 120 base.

However, resistor 112 applies a second supply-dependent component to the potential at this point. Moreover, the two components of potential have opposite polarity and hence tend to cancel. The amplifier is readily arranged such that the two components have substantially equal magnitude and thus cancel each other essentially completely. The result is that the signal at the transistor 120 base is relatively independent of fluctuations in the (+V) supply voltage.

Fluctuations in the negative supply voltage from supply 20 also have essentially negligible effect on the amplifier output voltage. This is because the signals in the input and intermediate stages of the amplifier are essentially unaffected by fluctuation in the voltage supply 20. More specifically, the current which transistors 28 and 30 apply to transistor 34 is essentially independent of the (−V) supply voltage. Further, transistors 34, 98 and 106 have relatively uniform current gain provided the (−V) supply voltage exceeds a minimum level. Also, these transistors have degeneration to enhance stable current gain in spite of (−V) supply fluctuations.

As further noted above, the input stage transistors 32 and 34 buffer the transistors 28 and 30 from the large voltage normally developed with the negative supply 20. In particular, transistors 28 and 30 are operated from a positive supply to enable the amplifier to handle positive input signals. The differential circuit cannot, however, efficiently operate directly between the (+V) and (−V) supply voltages. On the other hand, portions of the amplifier, such as transistor 106 and its load resistor 112, and likewise the push-pull transistors 150 and 152, require a large operating voltage as is developed between the (+V) and (−V) supply voltages. To meet these conditions, and couple the signal from the differential circuit of transistors 28 and 30 to transistor 106, the invention provides an efficient voltage buffering circuit with transistors 32 and 34.

These transistors couple the collectors of transistors 28 and 30 to the negative supply to develop the negative input voltage required for driving transistor 106. Moreover, they provide a buffer between the (—V) supply voltage and the near ground voltages applied to the emitters and bases of transistors 28 and 30. This is desired to avoid subjecting the transistors 28 and 30 to large reverse-bias voltages. Further, transistors 32 and 34 provide the signal-coupling and voltage-buffering operations with (—V) supplies of different values.

Considering the circuit more particularly, although the collectors of transistors 32 and 34 are returned to the (—V) supply voltage, the voltage divider formed with resistors 80 and 82 maintains the bases of these transistors at an intermediate voltage between (—V) and ground. Hence the emitters of transistors 32 and 34, coupled to transistors 28 and 30, are maintained at a voltage significantly more positive than the negative supply voltage and insufficient to damage the transistor 28 and 30, which are returned to the positive supply voltage.

With the foregoing amplifier construction, the two voltage supplies 18 and 20 can be selected independently of each other to have different voltages as desired for optimum performance in the display system or whatever other application is desired. For example, a large positive supply voltage may be used with a low negative supply voltage to provide fast cathode ray tube deflection in one direction where high deflection speed in the other direction is not required. Thus, the only limitation on the supply voltage is that their sum, i.e. the total voltage difference between (—V) and (+V), be sufficient to operate the circuit (minimum limit) and not exceed the rating of the transistors (maximum limit).

In sum, the invention provides a wide band amplifier well suited for electromagnetic deflection application. The amplifier is characterized by high versatility, fast transient response, automatic voltage limiting operation, and automatic current overload protection. Further, it has relatively few components and requires no delicate circuits. Note that no inductors or transformers are required, and capacitors are few. Hence, the amplifier is suited for low cost manufacture. In addition, it is is highly reliable.

Moreover, the amplifier is readily adjusted with a single control (the input stage adjustable resistor 62) to provide critical or other selected damping conditions over a substantially uniform bandwidth with loads of relatively widely varying reactances. It should be noted that adjusting this gain control has relatively little effect on other operating conditions of the amplifier.

These features enable an amplifier embodying the invention to have a bandwidth from DC to at least I megahertz. Further, the amplifier has an unusually short settling time to 0.1 percent of the final current it delivers to the coil in response to a change in input signal.

The amplifier attains these features and others, such as stability against fluctuating unregulated supply voltages and operation with unequal supply voltages, by efficient use of semiconductor stages, such as constant current sources and emitter followers. The adjustably-coupled differential input stage both provides the gain-bandwidth control and is important in providing stability against fluctuating supply voltages. Further, the differential configuration of the input stage, together with the placement of semiconductor diodes in the circuit, provides relatively uniform operation over a wide range of ambient temperatures. Specifically, temperature induced changes in the characteristics of transistors 28 and 30 in the high gain input stage cancel each other and diodes 72 and 74 thermally stabilize the bias of transistors 98 and 106.

It will thus be seen that the objects set forth above, among those made apparent from the preceding description, are efficiently attained and, since certain changes may be made in the above construction without departing from the scope of the invention, it is intended that all matter contained in the above description and accompanying drawing shall, unless stated to the contrary, be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. An electrical amplifier comprising:

A. input terminal means;

B. input circuit means 1. having first and second semiconductor amplifying elements forming a differential amplifier with said first element receiving an input signal responsive to the signal at said input terminal means;

C. output terminal means;

D. a third semiconductor amplifying element connected to receive an input signal responsive to the conduction of said second element and further arranged in circuit with said output terminals to change the signal applied thereto in response to changes in its said input signal;

E. a terminal arranged to receive a supply voltage;

F. second circuit means connected with said supply terminal and arranged to deliver a substantially uniform operating current to said first and second elements in response to supply voltage at said supply terminal;

G. Third circuit means connected with said supply terminal and a selected one of said first and second elements and arranged to offset the output signal from said selected element with a supply-dependent component having a polarity and magnitude responsive to the deviation of the supply voltage of said supply terminal from a selected value;

H. fourth circuit means 1. in circuit with said supply terminal and said third element;
2. applying to said third element a signal component responsive to the voltage at said supply terminal and having a phase and magnitude to diminish the signal component said third element receives due to said offset in said output signal of said selected one of said first and second elements;

I. So that conduction of said third element is responsive to conduction of said first element in response to said input signal and is comparatively independent of variations in the voltage at said supply terminal from said selected value.

2. An amplifier as defined in claim 1 in which said third circuit means comprises a resistive element in series between said supply terminal and said selected amplifying element and delivering further operating current to said selected element dependent on the magnitude of the supply voltage at said terminal.

3. An amplifier as defined in claim 2:

A. in which said second element is said selected one; and

B. further comprising constant current source means connected with said second element and diminishing the output signal therefrom by a fixed amount.

4. An amplifier as defined in claim 1 in which:

A. said fourth circuit means includes 1. a resistive element connected between said supply terminal and the input circuit path of said third amplifying element; and
2. a further semiconductor amplifying element receiving an input signal responsive to and corresponding to said output signal from said second amplifying element with said offset and drawing load current responsive to the input signal it receives through said resistive element;

5. A transistor amplifier circuit comprising:

A. input terminal means;

B. first and second transistors forming a differential amplifier with the base of said first transistor receiving an input signal responsive to the signal at said terminal means;
C. a constant current source arranged to deliver substantially fixed operating currents to the emitters of both said first and second transistors;
D. terminal means for receiving operating voltage for said first and second transistors;
E. a resistor connected between said supply terminal and the emitter of said second transistor; and
F. a constant current source connected with the collector of said second transistor and arranged to conduct a selected current in a direction relative to said second transistor opposite to the direction of current through said resistor.

6. An amplifier circuit as defined in claim 5 further comprising:
A. a pair of further transistors each of which is in a common base arrangement with the emitter thereof in circuit with the collector of a different one of said first and second transistor; and
B. supply means
1. applying a first extreme supply voltage to said current source;
2. applying a second extreme supply voltage to the collectors of said further transistors; and
3. applying a further supply voltage intermediate said extreme voltage to the bases of said further transistors.

7. A transistor amplifier circuit for producing an output signal having a component with a known relation to fluctuations in a supply voltage, said amplifier circuit comprising:
A. input terminal means;
B. first and second transistors forming a differential amplifier and receiving an input signal responsive to the signal at said terminal means;
C. a constant current source arranged to deliver a substantially fixed current to the emitters of said first and second transistors;
D. a supply terminal to which operating voltage for said transistors is applied; and
D. circuit means
1. connected between said supply terminal and the collector-emitter path of only one of said first and second transistors for providing a current path to said one transistor separate from the path thereto for said constant current source,
2. delivering to the emitter of only said one transistor via said separate current path a current responsive to the voltage at said supply terminal and in parallel with the current which the emitter of said one transistor receives from said constant current source, thereby to offset the conduction of said one transistor in proportion to the fluctuation of the voltage at said supply terminal.

8. An amplifier circuit as defined in claim 7 further comprising:
A. a resistor connected at one end to said supply terminal; and
B. a further transistor
1. in circuit with said one transistor to receive a base current responsive to the collector current of said one transistor; and
2. drawing load current responsive to said base current through said further resistor;
3. so that the potential at the end of said further resistor remote from said supply voltage terminal is essentially independent of fluctuations in the supply voltage applied to said supply terminal.

9. A differential transistor amplifier circuit comprising:
A. input terminal means;
B. first and second supply terminals;
C. first and second transistors,
1. forming a differential amplifier;
2. the base of at least said first transistor connected with said input terminal means to receive an input signal responsive to the signal at said input terminal means;
3. connected to receive at the emitters thereof operating currents from the potential at said first supply terminal; and
E. a pair of further transistors
1. each of which is arranged in a common base configuration with the emitter thereof in circuit with the collector of a different one of said first and second transistors to receive an emitter current responsive to the collector current of the transistor connected thereto;
2. having the bases thereof at the same potential intermediate the potentials at said first and second terminals; and
3. having the collectors thereof direct current coupled to said second supply terminal.

10. In an electronic circuit wherein a first transistor is arranged to draw a normally constant current from the emitter of an emitter-follower transistor, and said first, constant-current transistor has a resistive element connected between the emitter and a first supply terminal and a semiconductor-junction element connected between the base and said first supply terminal and poled to conduct forward current in the same direction relative to said base as the base-emitter junction of said first transistor, the improvement wherein:
A. a first diode is connected to conduct forward current between a second supply terminal and the base of said first transistor in the same direction as the forward conduction as said base; and
B. a second diode is connected to conduct forward current between said second supply terminal and the collector of said first transistor in the same direction as the collector-emitter conduction of that transistor.

11.

11. In a feedback amplifier circuit, the combination of:
A. a third transistor in an emitter-following arrangement;
B. a pair of output terminals;
C. fourth and fifth transistors
1. of opposite conductivity characteristics;
2. arranged with the base of said fourth transistor in circuit with the emitter of said third transistor to receive an input current corresponding to the emitter current of said third transistor;
3. arranged with the emitter electrodes thereof in circuit with one of said output terminals;
D. a pair of operating-voltage terminals arranged to receive supply voltages of opposite polarities and in circuit one with the collectors of said third and fourth transistors and the other with the collector of said fifth transistor;
E. at least first and second two-terminal semiconductor elements connected between the base electrodes of said fourth and fifth transistors and arranged to conduct forward current in the same direction such that the forward voltage drops thereacross augment the forward voltage applied to said fourth transistor;
F. constant current source means connected normally to draw forward current from the emitter of said third transistor through said first and second semiconductor elements;
G. a third two-terminal semiconductor element in series between the base of said fifth transistor and said current source and conducting as forward current the forward current said source draws through said first and second conductor elements.

12. An amplifier as defined in claim 11 further comprising:
A. semiconductor diode means in circuit between the emitter and base of said third transistor and arranged to conduct forward current in a direction opposite to the forward current conduction of said emitter-base junction of said third transistor; and
B. a capacitor element connected in parallel with at least said first and second semiconductor elements.

13. An electrical amplifier comprising:

A. input terminal means;
B. input circuit means
1. having first and second semiconductor amplifier elements forming a differential amplifier and receiving an input signal responsive to the signal at said input terminal means; and
2. having a resistance coupling said elements together so that a change in the conduction of one element causes an opposite change in the conduction of the other element;
C. output terminal means;
D. output circuit means
1. having fourth and fifth semiconductor amplifying elements in a balanced circuit and connected with said output terminal means to apply thereto an output signal responsive to the difference in conduction between said fourth and fifth elements; and
2. having a third semiconductor amplifying element connected to receive an input signal responsive to the conduction of said first and second elements and further connected with said fourth and fifth elements to change the conduction therein in opposite directions in response to changes in its said input signal;
E. bias circuit means connected with said fourth and fifth amplifying elements and normally applying a fixed bias signal to the combination of said fourth and fifth elements; and
F. semiconductor current-limiting switch means connected with said fourth and fifth elements and arranged automatically to shunt input drive signals from whichever one of said fourth and fifth amplifying elements that draws a selected large current.

14. An amplifier as defined in claim 13 in which:
A. said bias circuit means includes at least first and second bias circuit elements, each of which is connected with a different one of said fourth and fifth amplifying means; and
B. said switch means includes a separate switch element connected with each said bias circuit element and arranged to limit the drive signal applied to the one amplifying element connected therewith when that amplifying element conducts said selected current.

15. An electronic amplifier comprising:
A. drive circuit means including a third transistor arranged to receive a signal at the base thereof;
B. output terminal means;
C. output circuit means including fourth and fifth transistors
1. in a push-pull arrangement applying to said output terminal means an output signal responsive to the conduction of said fourth and fifth transistors;
2. said fourth transistor being arranged to receive a signal responsive to the conduction of said third transistor and to change the collector-emitter conduction therethrough in responsive to said signal it receives;
3. said fifth transistor being arranged to change the collector-emitter conduction therethrough opposite to conduction changes in said fourth transistor;
D. a first, normally forward-biased semiconductor element connected between the bases of said fourth and fifth transistors and developing a forward voltage drop therebetween with a polarity to augment the forward bias on each of said fourth and fifth transistors; and
E. constant current source means connected to draw a substantially fixed forward current through said semiconductor element from said third transistor.

16. An electronic amplifier as defined in claim 15 further comprising a second normally forward-biased semiconductor element in series with said first semiconductor element to develop a forward voltage drop between the base of said fifth transistor and said current source means.

17. An amplifier as defined in claim 15:
A. in which said first semiconductor element includes at least first and second series-connected diode elements arranged to conduct forward current directed the same as the forward emitter-base conductions of said fourth and fifth transistors;
B. further comprising first and second resistors in series between the emitters of said fourth and fifth transistors and interconnected at one terminal of said output terminal means;
C. comprising a further diode element in parallel with the series combination of said second resistor and the emitter-base junction of said fifth transistor and at least said second diode element and arranged to conduct forward current in the same direction as said emitter-base junction of said fifth transistor; and
D. Comprising a further transistor element having the emitter-base junction thereof in parallel with the series combination of said first resistor and the emitter-base junction of said fourth transistor and at least said first diode element and having the collector thereof connected with the base of said third transistor.

18. An amplifier as defined in claim 15:
A. in which said third transistor is arranged to deliver emitter current to the base of said fourth transistor and to said first semiconductor element;
B. further comprising a diode element in circuit between the emitter and base of said third transistor and arranged to conduct forward current in the direction opposite to the forward emitter-base conduction of said third transistor; and
C. further comprising a capacitor storage element connected to be charged by said forward voltage drop across said first semiconductor element and arranged to apply said stored charge to the emitter of said third transistor.

19. An electronic amplifier circuit comprising:
A. drive circuit means including a transistor arranged to receive a signal at the base thereof;
B. output terminal means;
C. output circuit means including two further transistors
1. in a push-pull arrangement applying to said output terminal means an output signal responsive to the conduction of said further transistors;
2. one of said further transistors being arranged to receive a signal responsive to the conduction of said drive circuit transistor and to change the collector-emitter conduction therethrough in response to said signal it receives;
3. the other of said further transistors being arranged to change the collector-emitter conduction therethrough opposite to conduction changes in said one transistor;
D. bias circuit means providing a substantially fixed total bias voltage between the bases of said further transistors;
E. transistor current source means developing a substantially fixed current at the emitter thereof and having said emitter direct-current coupled to the base of said drive circuit transistor;
F. a terminal arranged to receive a supply voltage;
G. a resistive element connected between said supply terminal and the base of said drive circuit transistor; and
H. amplifier means arranged to draw through said resistive element a current responsive to the input signal for said amplifier circuit, so that when said input signal causes said amplifier means to draw less than a selected current through said resistive element, said current source means supplies base current to said drive circuit transistor without developing a corresponding voltage across said resistive element.

20. An electronic amplifier circuit comprising:
A. fourth and fifth transistors of opposite conductivity types arranged in a push-pull configuration to develop an output current corresponding to the difference in the emitter currents thereof;
B. bias circuit means providing a substantially fixed total bias voltage between the bases of said fourth and fifth transistors, said bias circuit means including plural semiconductor diode elements connected in series succession with the same direction of forward current conduction between the base of said fourth transistor and the base of said fifth transistor and developing said total bias voltage as the sum of their individual forward voltage drops;

C. first and second current-sensing resistive elements each of which is in series with the emitter of one of said fourth and fifth transistors respectively;

D. first and second semiconductor switch means 1. each of which is connected in series with at least two of said bias diode elements with the same direction of forward conduction, and the series combination thereof with said diode elements is in parallel with the series arrangement of the emitter-base path of a different one of said fourth and fifth transistors and one said resistive element, and is poled to conduct forward current in the same direction as the emitter-base junction of said transistor which it parallels, and 2. each of which is normally maintained nonconductive by the forward voltage drops of said bias diode elements in series therewith and becomes conductive in response to an excessive current in the resistive element in parallel therewith.

UNITED STATES PATENT OFFICE

CERTIFICATE OF CORRECTION

Patent No. 3,569,849 Dated March 9, 1971

Inventor(s) John J. Cassidy and Melvin F. Silverstein

It is certified that error appears in the above-identified patent and that said Letters Patent are hereby corrected as shown below:

Column 5, line 26, after "136" insert --collector--

Column 7, line 25, after "transistor" insert --28 to cut off, with the result that transistor--.

Column 7, line 39, change "condition" to --conditio

Column 8, line 18, delete "protection," and insert therefor --regard--.

Column 8, line 70, after "push-pull" insert --output--.

Column 11, line 40 (Claim 7), subparagraph labelled "D" should be changed to --E--.

Column 12, line 35, "11." should be deleted.

Signed and sealed this 16th day of November 1971.

(SEAL)
Attest:

EDWARD M.FLETCHER,JR.
Attesting Officer

ROBERT GOTTSCHALK
Acting Commissioner of Patent

FORM PO-1050 (10-69)